US009418473B2

(12) United States Patent
Imber et al.

(10) Patent No.: US 9,418,473 B2
(45) Date of Patent: Aug. 16, 2016

(54) RELIGHTABLE TEXTURE FOR USE IN RENDERING AN IMAGE

(71) Applicant: Imagination Technologies Limited, Kings Langley (GB)

(72) Inventors: James Imber, Sible Hedingham (GB); Adrian Hilton, Guildford (GB)

(73) Assignee: Imagination Technologies Limited, Kings Langley (GB)

( * ) Notice: Subject to any disclaimer, the term of this patent is extended or adjusted under 35 U.S.C. 154(b) by 179 days.

(21) Appl. No.: 14/016,622

(22) Filed: Sep. 3, 2013

(65) Prior Publication Data

US 2014/0354645 A1    Dec. 4, 2014

(30) Foreign Application Priority Data

May 29, 2013   (GB) ...................................... 1309600

(51) Int. Cl.
*G06T 15/04*   (2011.01)
*G06T 15/60*   (2006.01)

(52) U.S. Cl.
CPC ................ *G06T 15/60* (2013.01); *G06T 15/04* (2013.01)

(58) Field of Classification Search
CPC ............................... G06T 15/04; G06T 15/60
See application file for complete search history.

(56) References Cited

U.S. PATENT DOCUMENTS

| 5,677,967 | A * | 10/1997 | Pariser | 382/167 |
| 2011/0234590 | A1 * | 9/2011 | Jones et al. | 345/426 |
| 2011/0285822 | A1 * | 11/2011 | Dai et al. | 348/46 |

OTHER PUBLICATIONS

Joe Kniss, Simon Premoze, Charles Hansen, Peter Shirley and Allen McPherson, "A Model for Volume Lighting and Modeling," IEEE Transactions on Visualization and Computer Graphics, vol. 9, No. 2, Apr.-Jun. 2003, p. 150-162.*

"Carved Visual Hulls for Image-Based Modeling" Lecture Notes in Computer Science, Computer Vision—ECCV 2006 Eds. Leonardis, Aleš, Bischof, Horst, Pinz, Axelhttp://dx.doi.org/10.1007/11744023_44Springer Berlin Heidelbergpp. 564-577.

Daniel Vlasic, Ilya Baran, Wojciech Matusik, and Jovan Popovit. 2008. Articulated mesh animation from multi-view silhouettes. ACM Trans. Graph. 27, 3, Article 97 (Aug. 2008), 9 pages. DOI=10.1145/1360612.1360696 http://doi.acm.org/10.1145/1360612.1360696.

(Continued)

*Primary Examiner* — Sing-Wai Wu
(74) *Attorney, Agent, or Firm* — Vorys, Sater, Seymour and Pease LLP; Vincent M DeLuca (57) ABSTRACT

A model of a scene of an image (e.g. a frame of a video sequence) is generated from one or more views of the scene captured from one or more different camera viewpoints. An initial texture for applying to the model is derived from the one or more views of the scene. The initial texture is separated into a lighting estimate and a color estimate, which may be orthogonal and which may be processed independently. The lighting estimate is filtered with a high-pass filter to thereby determine shadow regions of the scene which are regions of detailed shadow which are likely to be caused by ambient occlusion in the scene and which are therefore retained when the texture is relit for rendering the image. A shadow-detail estimate (or "dark map") is provided which indicates one or more shadow regions of the texture which are to remain in shadow when the image is rendered.

20 Claims, 6 Drawing Sheets

(3 of 6 Drawing Sheet(s) Filed in Color)

(56) References Cited

OTHER PUBLICATIONS

Dvir Steiner and Anath Fischer. 2002. Cutting 3D freeform objects with genus-n into single boundary surfaces using topological graphs. In Proceedings of the seventh ACM symposium on Solid modeling and applications (SMA '02). ACM, New York, NY, USA, 336-343. DOI=10.1145/566282.566330 http://doi.acm.org/10.1145/566282.566330.

Joel Carranza, Christian Theobalt, Marcus A. Magnor, and Hans-Peter Seidel. 2003. Free-viewpoint video of human actors. ACM Trans. Graph. 22, 3 (Jul. 2003), 569-577. DOI=10.1145/882262.882309 http://doi.acm.org/10.1145/882262.882309.

Shenchang Eric Chen and Lance Williams. 1993. View interpolation for image synthesis. In Proceedings of the 20th annual conference on Computer graphics and interactive techniques (SIGGRAPH '93). ACM, New York, NY, USA, 279-288. DOI=10.1145/166117.166153 http://doi.acm.org/10.1145/166117.166153.

Yung-Yu Chuang, Aseem Agarwala, Brian Curless, David H. Salesin, and Richard Szeliski. 2002. Video matting of complex scenes. ACM Trans. Graph. 21, 3 (Jul. 2002), 243-248. DOI=10.1145/566654.566572 http://doi.acm.org/10.1145/566654.566572.

Budd, et al. "Global Non-rigid Alignment of Surface Sequences" International J. of Computer Vision Mar. 2013, vol. 102, Issue 1-3, pp. 256-270.

Chenglei Wu; Wilburn, B.; Matsushita, Y.; Theobalt, C., "High-quality shape from multi-view stereo and shading under general illumination," Computer Vision and Pattern Recognition (CVPR), 2011 IEEE Conference on , vol., No., pp. 969,976, Jun. 20-25, 2011doi: 10.1109/CVPR.2011.5995388.

Csakany, P.; Hilton, A., "Relighting of Facial Images," Automatic Face and Gesture Recognition, 2006. FGR 2006. 7th International Conference on , vol., No., pp. 55,60, Apr. 2-6, 2006doi: 10.1109/FGR.2006.93.

Eisemann, et al. "Floating Textures" Technical Report / Computer Graphics Lab, TU Braunschweig ; Oct. 4, 2007 available at: http://www.digibib.tu-bs.de/?docid=00021424.

Grau, O.; Thomas, G.A.; Hilton, A.; Kilner, J.; Starck, J., "A Robust Free-Viewpoint Video System for Sport Scenes," 3DTV Conference, 2007 , vol., No., pp. 1,4, May 7-9, 2007. doi: 10.1109/3DTV.2007.4379384.

Hilton, A.; Guillemaut, J. -Y; Kilner, J.; Grau, O.; Thomas, Graham, "3D-TV Production From Conventional Cameras for Sports Broadcast," Broadcasting, IEEE Transactions on , vol. 57, No. 2, pp. 462,476, Jun. 2011.

J. Kilner, J. Starck, J.Y. Guillemaut, A. Hilton, Objective quality assessment in free-viewpoint video production, Signal Processing: Image Communication, vol. 24, Issues 1-2, Jan. 2009, pp. 3-16, ISSN 0923-5965, http://dx.doi.org/10.1016/j.image.2008.10.004.

Kanade, T.; Rander, P.; Narayanan, P.J., "Virtualized reality: constructing virtual worlds from real scenes," MultiMedia, IEEE , vol. 4, No. 1, pp. 34,47, Jan.-Mar. 1997doi: 10.1109/93.580394.

Leung, et al. "Representing and Recognizing the Visual Appearance of Materials using Three-dimensional Textons" International Journal of Computer Vision http://dx.doi.org/10.1023/A%3A1011126920638%I Kluwer Academic Publishers Jun. 1, 2001 pp. 29-44.

Levin, A.; Rav Acha, A.; Lischinski, D., "Spectral Matting," Pattern Analysis and Machine Intelligence, IEEE Transactions on , vol. 30, No. 10, pp. 1699,1712, Oct. 2008 doi: 10.1109/TPAMI.2008.168.

Mitchelson "Wand-based Multiple Camera Studio Calibration" CVSSP Technical Report 2003.

Sarim, et al., "Non-Parametric Patch Based Video Matting" Center of Vision, Speech and Signal Processing, U. of Surrey, Surrey, UK. 2009.

Sarim, M.; Hilton, A.; Guillemaut, J.-Y., "Temporal trimap propagation for video matting using inferential statistics," Image Processing (ICIP), 2011 18th IEEE International Conference on , vol., No., pp. 1745,1748, Sep. 11-14, 2011doi: 10.1109/ICIP.2011.6115797.

Seitz et al. "Toward Image-Based Scene Representation Using View Morphing" Technical Report #1298 May 1996 Department of Computer Sciences University of Wisconsin.

Seitz, S.M.; Curless, B.; Diebel, J.; Scharstein, D.; Szeliski, R., "A Comparison and Evaluation of Multi-View Stereo Reconstruction Algorithms," Computer Vision and Pattern Recognition, 2006 IEEE Computer Society Conference on , vol. 1, No., pp. 519,528, Jun. 17-22, 2006.

Sinha, S.N.; Mordohai, P.; Pollefeys, M., "Multi-View Stereo via Graph Cuts on the Dual of an Adaptive Tetrahedral Mesh," Computer Vision, 2007. ICCV 2007. IEEE 11th International Conference on , vol., No., pp. 1,8, Oct. 14-21, 2007 doi: 10.1109/ICCV.2007.4408997.

Starck, et al. "A Free-Viewpoint Video Renderer" Journal of Graphics, GPU, and Game Tools vol. 14, Issue 3, 2009.

Starck, et al. "Surface Capture for Performance-Based Animation" Centre for Vision, Speech and Signal Processing, University of Surrey, Guildford, UK. GU2 7XH (2007).

Theobalt, C.; Ahmed, N.; Ziegler, G.; Seidel, H. -P, "High-Quality Reconstruction from Multiview Video Streams," Signal Processing Magazine, IEEE , vol. 24, No. 6, pp. 45,57, Nov. 2007doi: 10.1109/MSP.2007.905701.

Tinghuai Wang; Collomosse, J., "Probabilistic Motion Diffusion of Labeling Priors for Coherent Video Segmentation," Multimedia, IEEE Transactions on , vol. 14, No. 2, pp. 389,400, Apr. 2012doi: 10.1109/TMM.2011.2177078.

Tinghuai Wang; Guillemaut, J. -Y; Collomosse, J., "Multi-label propagation for coherent video segmentation and artistic stylization," Image Processing (ICIP), 2010 17th IEEE International Conference on , vol., No., pp. 3005,3008, Sep. 26-29, 2010doi: 10.1109/ICIP.2010.5649291.

* cited by examiner

RELIGHTABLE TEXTURE FOR USE IN RENDERING AN IMAGE

CROSS REFERENCE TO RELATED APPLICATIONS

This application claims priority from GB 1309600.3, entitled "RELIGHTABLE TEXTURE FOR USE IN RENDERING AN IMAGE", filed on May 29, 2013, which is incorporated by reference in its entirety herein for all purposes.

BACKGROUND

An image may represent a view of a scene as captured from the viewpoint of a camera. In some cases there may be more than one camera capturing different views of a scene. However, there will be some viewpoints of the scene which do not correspond to any of the camera viewpoints. The image may be a frame of a video sequence. Techniques such as Free-viewpoint video rendering (FWR) allow a novel view of a scene to be generated based on a set of multiple views of the scene from multiple camera viewpoints. The cameras are preferably calibrated and synchronized with each other so that the views of the scene can be combined correctly.

Based on the different views of the scene, a model (which may be referred to as a "geometric proxy") of the scene may be constructed and a texture may be formed which can be applied to the model. The model, with the texture, can then be used to render the scene from a rendering viewpoint which may, or may not, be the same as one of the camera viewpoints. As well as recreating a "real-world" scene from a rendering viewpoint, the content of the real-world scene may be mixed with computer-generated content.

There are a number of issues which may need to be considered when generating a novel viewpoint of a scene. For example, relighting of the scene can be difficult. Textures extracted from images (e.g. frames of a video sequence) captured by cameras have implicit real-world lighting information, such that lighting artefacts are present (i.e. "baked-in") in the textures.

One way of addressing the problem of how to relight the textures for a novel viewpoint is to control the lighting of the scene at the time when the cameras capture the different views of the scene. For example, diffuse lighting can be used in the initial video capture to avoid creating excess shaded areas that will damage the plausibility of the scenes rendered using extracted textures. The effects of lighting changes may be automatically addressed, but this may require an active lighting arrangement to deduce the material properties of the textures. However, relighting scenes with arbitrary lighting arrangements is considerably more challenging. Similar challenges apply to relighting textures with arbitrary lighting arrangements irrespective of how the textures were formed from captured images of scenes, for example when only one camera is used to capture an image of a scene from a single camera viewpoint and/or when the rendering viewpoint is the same as one of the camera viewpoints.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A model of a scene (e.g. in free-viewpoint rendering) is generated from one or more views of the scene captured from one or more different camera viewpoints. An initial texture for applying to the model is derived from the one or more views of the scene. The initial texture may, for example, be a blended texture which is determined by blending different views of the scene from different camera viewpoints. In examples described herein the initial texture is separated into a lighting estimate and a colour estimate, which may be orthogonal and which may therefore be processed independently. The lighting estimate may be filtered with a high-pass filter to thereby determine shadow regions of the scene which are regions of detailed shadow which are likely to be caused by ambient occlusion in the scene and which are therefore retained when the texture is relit for rendering the image. The filtered lighting estimate may provide a shadow-detail estimate (or "dark map") which indicates one or more shadow regions of the texture which are to remain in shadow when the image is rendered.

In particular, there is provided a method of determining a relightable texture for use in rendering an image from a rendering viewpoint under arbitrary lighting conditions, wherein at least one view of a scene from a respective at least one camera viewpoint represents the image, the method comprising: separating an initial texture for the image into a lighting estimate and a colour estimate, said initial texture being derived from the at least one view of the scene from the at least one camera viewpoint; generating a shadow-detail estimate by filtering the lighting estimate to attenuate low frequency components thereof, wherein the shadow-detail estimate indicates one or more shadow regions of the relightable texture which are to remain in shadow when the image is rendered; and determining the relightable texture for the image using the lighting estimate, the colour estimate and the shadow-detail estimate.

There is also provided an image processing system configured to determine a relightable texture for use in rendering an image from a rendering viewpoint under arbitrary lighting conditions, wherein at least one view of a scene from a respective at least one camera viewpoint represents the image, the image processing system comprising a processing block configured to: separate an initial texture for the image into a lighting estimate and a colour estimate, said initial texture being derived from the at least one view of the scene from the at least one camera viewpoint; generate a shadow-detail estimate by filtering the lighting estimate to attenuate low frequency components thereof, wherein the shadow-detail estimate indicates one or more shadow regions of the relightable texture which are to remain in shadow when the image is rendered; and determine the relightable texture for the image using the lighting estimate, the colour estimate and the shadow-detail estimate.

There is also provided an image processing apparatus configured to determine a relightable texture for use in rendering an image from a rendering viewpoint under arbitrary lighting conditions, wherein at least one view of a scene from a respective at least one camera viewpoint represents the image, the image processing apparatus comprising: a separation module configured to separate an initial texture for the image into a lighting estimate and a colour estimate, said initial texture being derived from the at least one view of the scene from the at least one camera viewpoint; a shadow-detail module configured to generate a shadow-detail estimate by filtering the lighting estimate to attenuate low frequency components thereof, wherein the shadow-detail estimate indicates one or more shadow regions of the relightable texture which are to remain in shadow when the image is rendered; and a texture module configured to determine the relightable texture for the image using the lighting estimate, the colour estimate and the shadow-detail estimate.

There is also provided a computer program product configured to determine a relightable texture for use in rendering an image from a rendering viewpoint under arbitrary lighting conditions, the computer program product being embodied on a computer-readable storage medium and configured so as when executed on a processor to perform any of the methods described herein. There is also provided a computer readable storage medium having encoded thereon computer readable program code for generating a processing block configured to perform any of the methods described herein.

The above features may be combined as appropriate, as would be apparent to a skilled person, and may be combined with any of the aspects of the examples described herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Examples will now be described in detail with reference to the accompanying drawings in which.

Common reference numerals are used throughout the figures, where appropriate, to indicate similar features.

DETAILED DESCRIPTION

Embodiments will now be described by way of example only. The examples described in detail herein relate to free-viewpoint rendering, but the same principles of determining a relightable texture can be applied in other examples, e.g. in which there is only one camera (rather than multiple cameras as in free-viewpoint rendering) capturing a view of a scene, and/or in which the rendering viewpoint is the same as the camera viewpoint.

Free-viewpoint rendering allows an image to be generated to provide a novel view of a scene based on a set of multiple views of the scene from multiple camera viewpoints. As an example, the generated image may be a frame within a generated video sequence. Free-viewpoint video rendering (FWR) is the synthesis of novel views of a scene that changes with time, with reference to video data captured using a set of cameras. The material properties (e.g. specularity) of objects in the scene are taken into account when rendering the scene from a novel viewpoint to increase the plausibility of the relighting of the scene. Most standard FWR systems do not support relighting of the scene. However, examples described herein allow a scene to be relit and viewed under arbitrary lighting conditions when the scene is rendered from the novel viewpoint. For example, where the image is a frame of a video sequence the examples described herein relate to "relightable FWR". In previous FWR systems which do support relighting of the scene, small regions of shadow are often not relit correctly when a novel viewpoint is rendered. This may be because ambient occlusion is not sufficiently considered. Ambient occlusion relates to the expectation that a region of an object that is relatively inaccessible to light should appear dark compared to the rest of the object, regardless of how the object is lit. For example, the inside of a vase, the eye sockets of a face and folds in clothing should often appear dark when the scene is lit and viewed from any angle. Enhanced realism is achieved in reproducing fine details by taking ambient occlusion in to account.

There are described herein examples in which small regions of shadow (herein referred to as "shadow regions") which are indicative of localised ambient occlusion in the scene are retained when the scene is lit and viewed from any angle. Low frequency components of shadow tend to be due to the particular lighting arrangement of the scene as the views are captured. For example, a whole side of an object facing away from a light source may be in shadow. If the scene is relit from a different angle then these low frequency components of shadow may be relit if they are no longer in shadow in the relit scene. By contrast, high frequency components of shadow tend to be due to areas of localised ambient occlusion in the scene, which remain in shadow even if the scene is relit from a different angle. The threshold between what is considered a "low frequency component" and what is considered a "high frequency component" is implementation dependent and in the case that the image is a frame of a video sequence the threshold may be fixed for the rendering of a video sequence, or alternatively may be adaptable for different frames of the video sequence, for example based on a measure of the light intensity of a frame or a measure of the level of detail in the frame. As described below, the threshold may be implemented as a cut-off frequency of a high-pass filter used to filter a lighting estimate of the scene. Therefore, the high-pass filter can be used to filter the lighting estimate and the remaining components (that is, the "high frequency components") form a shadow-detail estimate (which may be referred to herein as a "dark map") which indicates shadow regions which are to remain in shadow when the scene is relit.

Figure 1:
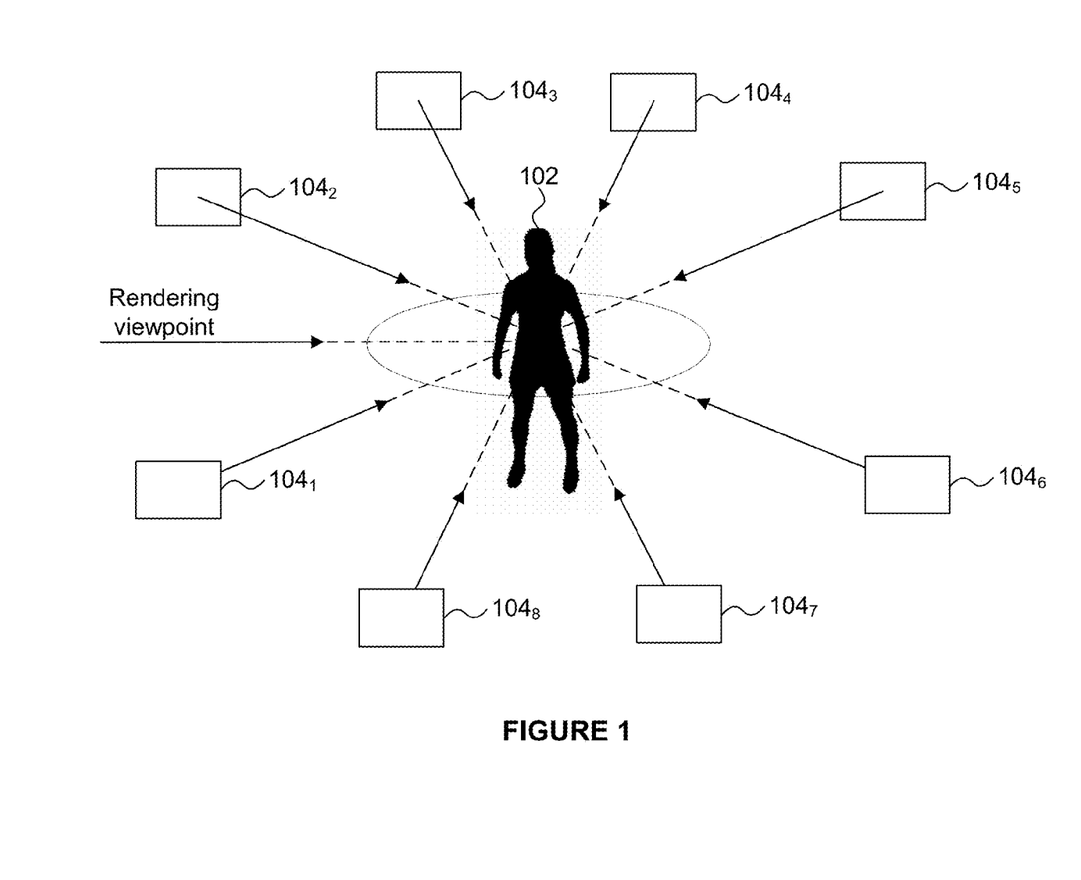
FIG. 1 represents an arrangement in which a plurality of cameras are arranged to capture different views of a scene.

FIG. 1 shows an object (e.g. a person 102) which is part of a scene. Eight cameras $104_1$ to $104_8$ are shown in FIG. 1 which are capturing different views of the scene from respective camera viewpoints. However, the system for capturing the views of the scene is not limited to using eight cameras and in other examples a different number of cameras (e.g. fewer than eight or more than eight cameras) may be used to capture views of the scene. In the example shown in FIG. 1 the scene comprises the person 102 in view of all eight of the cameras 104 against a plain (e.g. monochromatic) background. The images captured by the cameras 104 may be frames of a video sequence, but in other examples the cameras capture views of a scene for use in rendering an image at a single point in time, i.e. the image might not be a frame of a video sequence. In this example, the cameras are calibrated with reference to a common coordinate system, and the frames of video captured by each camera 104 are captured at synchronized timings. Furthermore, it simplifies the implementation of the image processing system if all of the cameras have the same operating parameters, e.g. the same number of pixels, the same formatting protocol, etc, so that the image data representing the views of the scene can be combined without further steps of converting data captured by one or more of the cameras into a different format. The eight cameras 104 provide eight different camera viewpoints of the scene. However, with the use of FWR, the scene may be rendered from a rendering viewpoint which may not be the same as any of the camera viewpoints. For example, FIG. 1 shows a rendering viewpoint which is different to all of the eight camera viewpoints. If the cameras are synchronized then each view of the scene is captured by all of the cameras simultaneously. In other examples, it is possible to use unsynchronized cameras but it becomes more difficult to combine the different views of the scene because time, as well as space, becomes a variable that is taken into account in combining the views of the scene.

Figure 4:
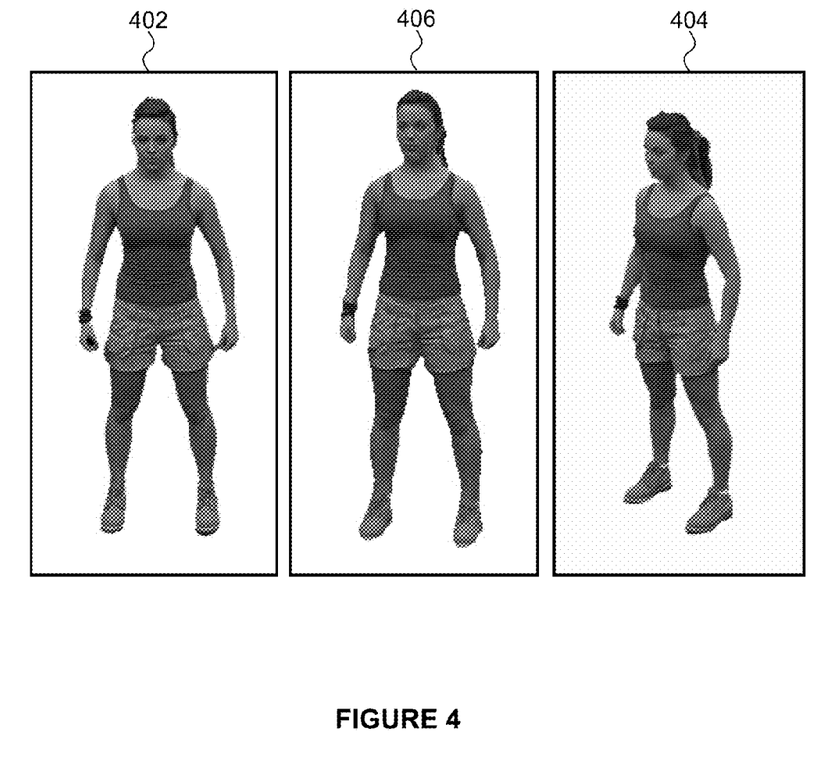
FIG. 4 shows two views of a scene from two camera viewpoints, and shows a rendered frame for the scene from a rendering viewpoint.

FIG. 4 shows a first view 402 of the scene taken from the viewpoint of the camera $104_1$. The scene includes the person 102 against the plain background. FIG. 4 also shows a second view 404 of the scene taken from the viewpoint of the camera $104_2$. FIG. 4 also shows a novel view 406 of the scene from the rendering viewpoint which has been rendered according to methods described herein. It can be seen that the rendering viewpoint is between the camera viewpoints of the cameras $104_1$ and $104_2$.

Figure 2:
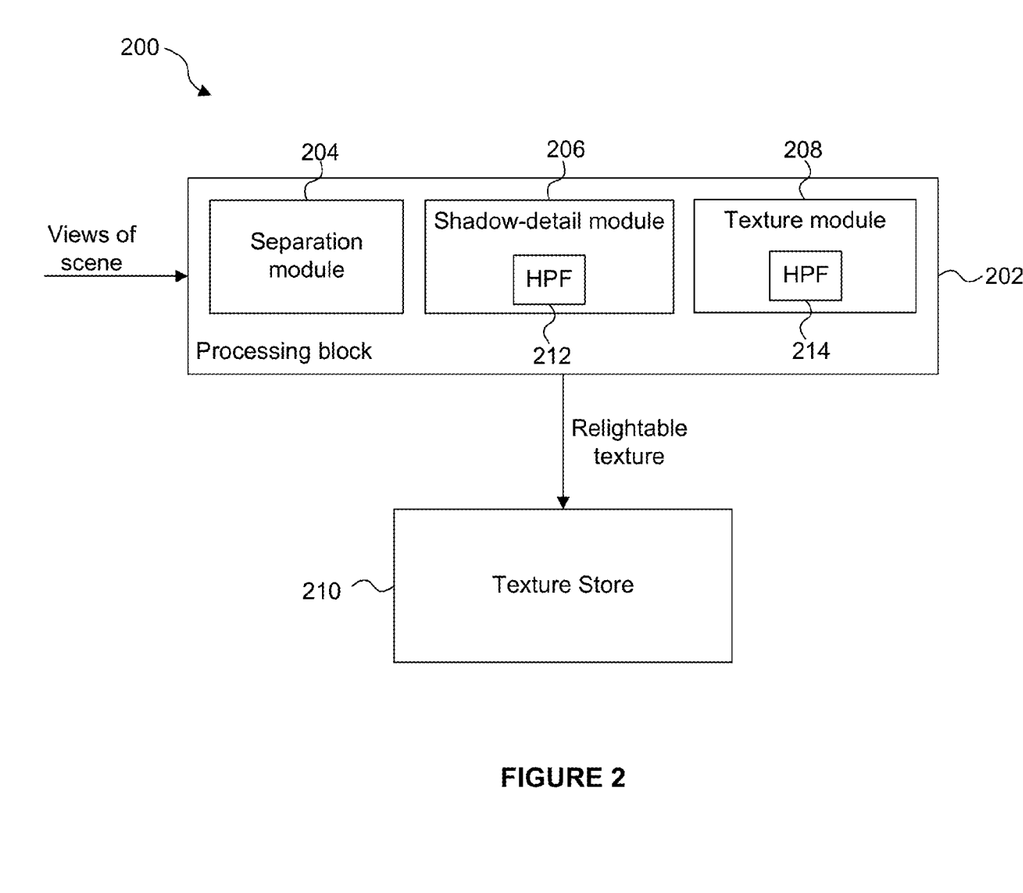
FIG. 2 is a schematic diagram of a video processing system.

FIG. 2 shows an image processing system 200 (e.g. a video processing system in the case that the images are frames of a video sequence) which comprises a processing block 202 and a texture store 210. The processing block 202 comprises a separation module 204, a shadow-detail module 206 and a texture module 208. The shadow-detail module 206 comprises a first high-pass filter 212. The texture module 208 comprises a second high-pass filter 214. The processing block 202 is configured to receive data representing the views of the scene from the cameras 104. The processing block 202 (e.g. the separation module 204, shadow-detail module 206 and/or the texture module 208) is configured to process the views of the scene to determine a relightable texture for use in rendering an image from the rendering viewpoint under arbitrary lighting conditions. The texture store 210 may be implemented as a memory for storing relightable textures.

Figure 3:
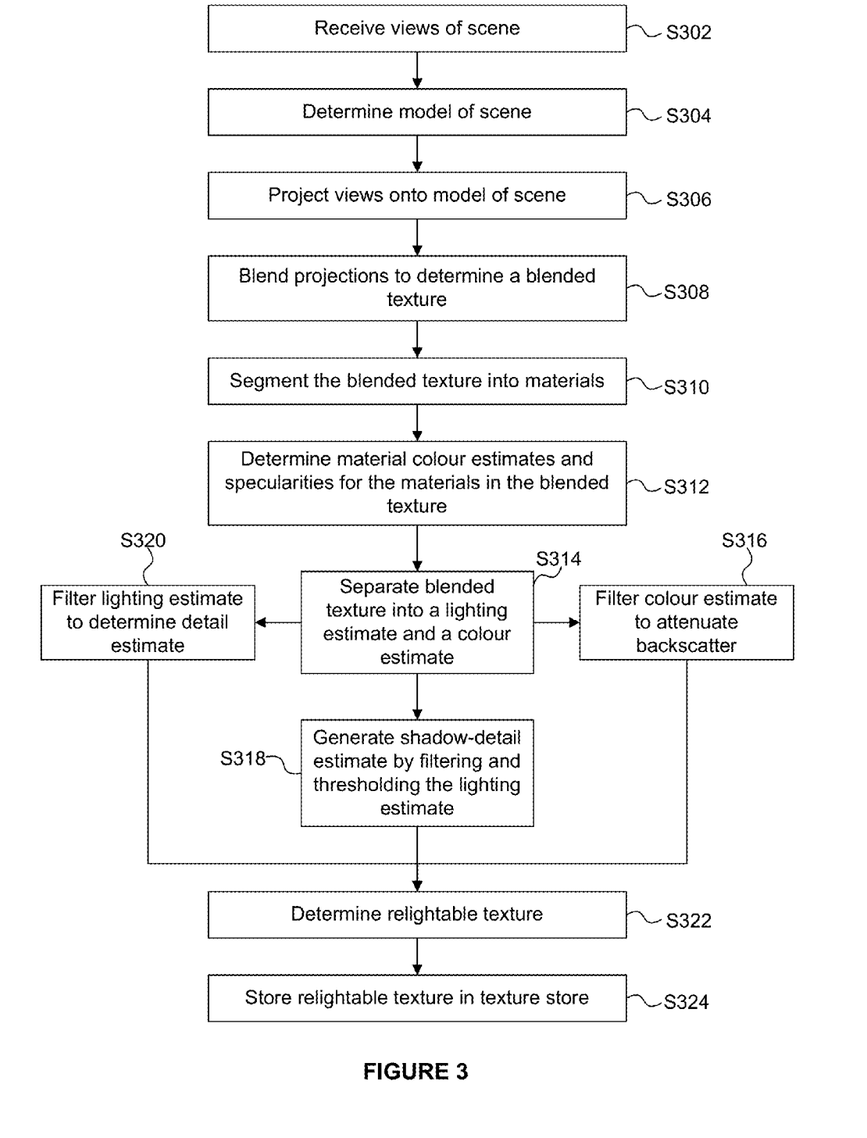
FIG. 3 is a flowchart for a process of determining a relightable texture for use in rendering a frame of a video sequence from a rendering viewpoint under arbitrary lighting conditions.

Operation of the image processing system 200 is described with reference to the flow chart shown in FIG. 3. In the examples described in detail herein, the method steps shown in FIG. 3 are performed offline, i.e. before the scene is to be rendered from the rendering viewpoint. In other examples, the method steps shown in FIG. 3 may be performed at runtime, i.e. as the scene is being rendered, but this requires a large amount of processing resources for the render which are usually not available at a mobile device. The method steps shown in FIG. 3 may be performed responsive to the views of the scene being captured by the cameras 104. A model (or "proxy") of the scene is constructed based on the different views of the scene and a relightable texture is formed which can be applied to the model. The model with the relightable texture can then be stored, e.g. in the texture store 210. Subsequently, at render time, the model and relightable texture can be retrieved from the memory and the scene can be rendered from the rendering viewpoint. Since in the examples described in detail herein, a lot of the processing is front-loaded (i.e. performed before the scene is rendered), the processing that is performed during rendering is reduced. The offline steps (i.e. preprocessing steps) performed before the rendering of the scene to determine the model and the relightable texture representing the scene may be implemented in a computer which has a lot of available resources, e.g. processing power and memory. The preprocessing steps may take a significant time to complete, e.g. such that each image may take of the order of tens of minutes (e.g. 20 minutes) to process. The rendering of the scene from the rendering viewpoint may be implemented on the same device or a different device as that which performed the preprocessing steps. For example, the output from the preprocessing steps (i.e. the model and the relightable texture) may be provided to a rendering device, such as a mobile device for rendering an image from an arbitrary rendering viewpoint under arbitrary lighting conditions. The output from the preprocessing steps may be used to render multiple images for a scene, where each image may be rendered from a different rendering viewpoint and with different lighting conditions. When the image is a frame of a video sequence, and the video is rendered, the video may be output in real-time, with multiple frames (e.g. twenty frames) being processed per second. The processing resources of the rendering device may be limited; this is particularly the case when implementing the renderer on a mobile device for which the processing power and memory capacity may be significantly limited. Since a substantial amount of the processing is performed in the preprocessing steps, the processing performed at the time of rendering is reduced, which can allow a video to be rendered and output in real-time (e.g. at at least approximately 20 frames per second) even on rendering devices such as mobile devices which may have limited resources available.

In step S302 the views of the scene are received at the processing block 202 from the cameras 104. The data representing the views of the scene may be provided from the cameras 104 to the processing block 202 via any suitable link, e.g. a wired or wireless link.

In step S304 a model of the scene is determined. There are many ways of constructing a 3D geometric proxy (i.e. a "model") of the scene, and these processes are known as "image-based modelling" in the art. For example, the use of a wide-baseline capture system favours the use of a visual hull to produce a coarse upper-bound to the scene geometry, which can subsequently be refined by triangulating the positions of features extracted from surface detail.

In step S306 the views of the scene from the different camera viewpoints are projected onto the model of the scene. Methods for projecting the views onto the model are known in the art. It will be appreciated that each view of the scene will usually include data for some, but not all, of the surfaces of the model of the scene onto which that view can be projected. For example, a view of the front of the person 102 may not include any data for projection onto the back of the person 102 in the model of the scene. However, preferably all of the surfaces of the model of the scene are in view of at least one of the cameras 104 such that the combination of views of the scene from the different cameras 104 can be used to project a view onto the whole of the model of the scene.

The images, the model and the textures described herein may each be represented by an array (e.g. a 2D array) of spatially distinct units which can each have one or more values associated with them. As a matter of terminology, these spatially distinct units may be referred to with different terms. That is, the spatially distinct units of an image (in display-space) which is intended to be viewed are referred to herein as "pixels"; the spatially distinct units of a texture (in texture-space) are referred to herein as "texels"; and the spatially distinct units of the model (in the 3D model-space) are referred to herein as "fragments".

In step S308 the views of the scene which have been projected onto the model are blended to determine a blended texture (which may be referred to as a "UV map"). For example, for each fragment of the model, each camera is classified according to how well the camera can view that fragment of the model, e.g. based on whether the camera can directly view the fragment of the model, whether the view of the fragment from the camera is obstructed, and/or the angle between the camera viewpoint and the surface normal of the model at the fragment position. The views from one or more of the cameras (e.g. those with the highest classifications for the fragments of the model) can then be blended based on the classifications for the different cameras, e.g. for each fragment position of the model, the projected values from the one or more camera viewpoints may be summed together in a weighted sum wherein the weights of the sum are determined based on the classifications of the cameras. In some examples, for each fragment of the model, the projected value from the camera with the best classification for that fragment is chosen and then those values for the fragments of the model are used to form the blended texture. The blended texture may be a map of per texel values which can be applied to the geometric model for use in rendering the scene from a rendering viewpoint. The blended texture may include three colour components, such as Red, Green and Blue (RGB) components, which may be treated independently. That is, when a model and a blended texture have been determined a view of the scene from a rendering viewpoint can be determined by determining how the model, with the blended texture applied thereto, would appear from the rendering viewpoint. The following steps of the method are performed to improve the plausibility of the rendered view of the scene, in particular when the scene is relit under arbitrary lighting conditions.

In the examples described in detail herein a blended texture is used. A blended texture is just one example of an initial texture which may be used. In general terms, any initial texture which is derived (by blending or otherwise) from the views of the scene from the camera viewpoints may be used in the same way that the blended texture is used in the examples described in detail herein.

Different materials in a scene will interact with light differently. Therefore, the relighting of a scene will depend upon the materials that are present in the scene. In step S310, the blended texture is segmented into materials. The segmentation of the blended texture into materials may be performed automatically, manually or a combination thereof. For example, some prior information relating to the approximate locations of the different materials in the blended texture are used to form a soft constraint on the position and typical colour distributions of each of the materials in the blended texture. For the first image of a sequence of captured images (e.g. the first frame of a captured video sequence), a manual segmentation of the blended texture is used to obtain the prior information for use by an automatic segmentation process to segment the blended textures for subsequent images of the sequence.

A colour model for each material in the blended texture is used. Contiguous groups of similarly coloured texels are segmented into materials using the colour models for the materials. The segmentation of the blended texture into materials may be performed in a number of different ways, which for conciseness are not described in great detail herein. However, as an example, the colour distribution of the materials may be modelled using a Gaussian Mixture Model which fits a small number of Gaussians to the dataset to approximate the probability density function in RGB space. Sampling at a particular combination of R, G and B co-ordinates for a texel position of the blended texture will return a probability that the texel position belongs to a particular material. Other factors may be taken into account, such as temporal coherence and a likelihood that spatial contiguous groups of similarly coloured texels belong to the same material, before a final segmentation of the blended texture into materials is determined, e.g. based on the segmentation with the highest probability.

In step S312, given the blended texture with materials segmented, material properties are extracted. In particular, material colour (which may be referred to as "colour albedo") and specularity are estimated on a per-material basis. The determination of the material colour estimates (that is, the non-specular colouring for the materials) may be performed in a number of manners. For example, histograms may be determined of the texel intensities for the three colour components (e.g. R, G and B components) of the texels belonging to a particular material, and the 90% point of the histograms may be found and used to determine the material colour estimates. In an example, the texel intensity, y, for each of the colour components is represented by eight bits and is in the range $0 \le y \le 255$. For example, the material colour estimate, $I_{MAT}$, for a material may be given by:

$$I_{MAT} = \zeta [s(H_R) s(H_G) s(H_B)]^T$$

where T indicates a transpose operation and where s(H) returns y such that $\int_0^y H(\mu)d\mu = 0.9 \int_0^{255} H(\mu)d\mu$. By experimentation, the 90% point of the histogram was found to be a good indicator of colour albedo of a material. Lower points on the histogram suffer from an increasingly significant, coloured ambient lighting component caused by backscattering from the background of the captured scene which may be a chroma-keyed screen. On the other hand, points near 100% on the histogram are heavily influenced by specular highlights. The parameter $\zeta$ is found by experimentation, to match the vector $[s(H_R) s(H_G) s(H_B)]^T$ as closely as possible to the observed colour albedo of the material.

The specularities (or "specular components") for the materials may be determined in a number of different ways. For example, once the material colour estimate has been obtained, the strength of the specular component of the material can be estimated. It may be assumed that the materials being modelled are relatively unsmooth, such that the specular highlights cover a relatively large range of angles. The specular components of the material may be determined using the determined material colour estimates and the texel intensities of the blended texture for the three colour components of a material. As an example, the specular components of the materials may be modelled by a small, fixed exponent in a Phong lighting model.

Therefore, following step S312 there is provided a model of the scene, and a blended texture for the scene which has been segmented into materials whereby a material colour estimate and a specularity has been determined for each of the materials.

Assuming Lambertian reflectance, the appearance of a scene relies on two separate, interacting factors: surface lighting (a result of scene lighting and surface geometry) and surface colour albedo. Therefore, in step S314, the separation module 204 separates the lighting component and the colour component of the blended texture, thereby determining a lighting estimate and a colour estimate for the image. The lighting estimate and the colour estimate are maps which have per texel values, i.e. a value for each texel position of the texture. Since colour is estimated on a per-texel basis, the colour estimate preserves localised colours that may be different to the material colour of the materials. The lighting estimate and the colour estimate are mutually orthogonal, which allows them to be processed independently. Independent processing of the lighting component and the colour component of the blended texture allows ambient occlusions in the scene to be modelled for use in determining a relightable texture which can be applied to the model for rendering the scene from the rendering viewpoint.

The lighting estimate and the colour estimate are complementary to each other in the sense that, for each texel position, a combination (e.g. a multiplication) of the value of the lighting estimate and the colour estimate for the texel position can be used to provide the value of the blended texture for the texel position. In this sense the blended texture is split into the lighting estimate and the colour estimate. Step S314 is an image-based process and does not require knowledge of the surface geometry, i.e. the geometry of the model of the scene.

For example, the separation module 204 may determine the lighting estimate using the blended texture and the material colour estimates. For example, for each colour component, C, a lighting estimate $I_L^C(\underline{x})$ for a texel position, $\underline{x}$, is determined according to the equation:

$$I_L^C(\underline{x}) = \frac{I^C(\underline{x})}{I_{MAT}^C(\underline{x})} \quad (1)$$

where $C \in \{R, G, B\}$, $I^C(\underline{x})$ is the intensity of the blended texture for colour component C at texel position $\underline{x}$ and where $I_{MAT}^C(\underline{x})$ is the material colour estimate for colour component C of the material at texel position $\underline{x}$.

The lighting estimates $I_L^C$ for the colour components determined according to equation (1) will have some slight colouration, and this may be removed by converting the image to greyscale using a set of channel coefficients. In other words, the different colour components of the lighting estimate determined according to equation (1) can be combined to provide a scalar lighting estimate for the texture, which has a single component having values for each texel position. For example, the scalar lighting estimate, $I'_L(\underline{x})$, may be determined according to a standard set of channel coefficients, such that:

$$I'_L(\underline{x}) = 0.299 I_L^R(\underline{x}) + 0.587 I_L^G(\underline{x}) + 0.114 I_L^B(\underline{x}) \quad (2)$$

In other examples, the scalar lighting estimate $I'_L(\underline{x})$ is determined using different sets of channel coefficients to those given in equation (2).

In an example, the lighting estimate $I'_L(\underline{x})$ and the blended texture $I^C(\underline{x})$ are used to determine the per texel values of the three colour components of the colour estimate, $I_A(\underline{x})$. For example, each of the colour components (e.g. R, G, B) of the colour estimate, $I_A^C(\underline{x})$ at texel position $\underline{x}$, may be determined according to the equation:

$$I_A^C(\underline{x}) = \frac{I^C(\underline{x})}{I'_L(\underline{x})}$$

Although there exists a huge range of possibilities for splitting the blended texture, $I^C(\underline{x})$, into two components which, when multiplied together on a texelwise basis, reproduce the original result, the splitting of the blended texture, $I^C(\underline{x})$ into a lighting estimate and a colour estimate as described above accurately represents the dichotomy of colour albedo and surface lighting. These two estimates (that is, the lighting estimate and the colour estimate) are mutually orthogonal in the sense that the colour estimate contains no lighting information, and the lighting estimate contains no colour information.

As described above, the scene may be captured using a chroma-key background (e.g. a monochromatic background), and the blended texture for the person 102 in the scene may include some coloured backscatter from the background. The influence of backscatter from the background on the colour estimate may be removed to achieve more realistic results. In step S316 the colour estimate is filtered to attenuate backscatter from the coloured background. The effects of the backscatter are more noticeable on parts of the person 102 which are not directly illuminated from a primary light source. As an example, where a blue background is used, the following simple filter may be used to filter the colour estimate, $I_A^C(\underline{x})$:

$$I'^C_A(\underline{x}) = \begin{cases} I_A^C(\underline{x}), & \text{if } \frac{B}{R} < \alpha_R \text{ and } \frac{B}{G} < \alpha_G \\ I_{MAT}^C(\underline{x}), & \text{otherwise} \end{cases}$$

where $\alpha_R$ and $\alpha_G$ are thresholds which are implementation dependent and which determine when the (coarse) material colour estimate is to be used instead of the (fine) texelwise colour estimate. In some examples $\alpha_R = \alpha_G$. For example, it was found by trial and error that setting $\alpha_R = \alpha_G = 1.1$ gives good results. In other examples, $\alpha_R$ and/or $\alpha_G$ may be set to other values.

Using this filter means that for pixel positions of the colour estimate at which the blue component is not significantly stronger than the red and green components, i.e. where $$\frac{B}{R} < \alpha_R \text{ and } \frac{B}{G} < \alpha_G,$$

the filtered colour estimate $I'^C_A(\underline{x})$ equals the unfiltered colour estimate $I_A^C(\underline{x})$. However, for pixel positions of the colour estimate at which the blue component is significantly stronger than the red and green components, i.e. where $$\frac{B}{R} \geq \alpha_R \text{ and/or } \frac{B}{G} \geq \alpha_G$$

then the filtered colour estimate $I'^C_A(\underline{x})$ equals the material colour estimate $I_{MAT}^C(\underline{x})$ for the material at texel position $\underline{x}$. Therefore detail is maintained in the colour estimate for regions of the texture in which the blue component is not significantly stronger than the red and green components. Although a substantial part of the colour detail in some parts of the colour estimate is lost in the colour filtering stage of step S316, the loss of colour detail is usually not perceptually significant on the final render of the scene from the rendering viewpoint, since the human vision system is much better adjusted to perceiving detail in luminosity rather than in colour.

In other examples, the colour estimate might not be filtered to attenuate the backscatter from the coloured background.

In step S318 the shadow-detail module 206 generates a shadow-detail estimate. The shadow-detail estimate may also be referred to herein as a "dark map", and is a map of per texel values. The dark map indicates one or more shadow regions of the relightable texture. Shadow regions are indicative of localised ambient occlusion in the scene, and should remain in shadow when the scene is lit and viewed from any angle as the frame is rendered.

In preferred examples, the shadow-detail estimate provides gradiated per-texel darkness values to describe the level of shadow to apply to the texels within the shadow regions of the relightable texture. For example, the shadow-detail estimate may be a per-texel set of scalars having a plurality of possible values in the range from 0 to 1, where 0 represents the deepest shadow estimate (e.g. black) and 1 represents no shadow. The number of possible values that the shadow-detail estimate can take is dependent upon the number of bits used to represent each value of the shadow-detail estimate. Therefore, the shadow-detail estimate may indicate levels of shadow that are present in the shadow regions. In other words, the shadow-detail estimate may comprise a set of per-texel values, each of which indicates a level of shadow to be applied to a respective texel within the one or more shadow regions of the relightable texture when the relightable texture is determined.

The shadow-detail estimate, $I_D(\underline{x})$, is generated by filtering the lighting estimate, $I'_L(\underline{x})$, to attenuate low frequency components thereof. For example, the first high-pass filter 212 may be applied to the lighting estimate to generate the shadow-detail estimate. A cut-off frequency of the first high-pass filter 212 sets a threshold which determines whether a frequency component of the lighting estimate is considered "low" and is therefore attenuated. The cut-off frequency of the first high-pass filter 212 is implementation dependent and may be fixed, e.g. for rendering a video sequence, or alternatively may be adaptable, e.g. such that it changes for different frames of a video sequence. An adaptable cut-off frequency may, for example, be based on a measure of the light intensity of a frame or a measure of the level of detail in the frame. By removing the low frequency components from the lighting estimate, only the details (i.e. high frequency components) of the lighting estimate are retained for use in the shadow-detail estimate. This is useful because the low frequency components of the lighting estimate are likely to depend strongly on how the scene was lit when the cameras 104 captured the views of the scene. In contrast, high frequency components of the lighting estimate (i.e. finer details of the changes to the lighting of the scene) are likely to be due to ambient occlusions in the scene (e.g. folds in clothing, etc.) and should remain largely in shadow even if the scene is rendered with a different viewpoint and with different lighting to that used when the views of the scene were captured by the cameras 104.

The shadow-detail estimate, $I_D(\underline{x})$, may preferably be thresholded so that it indicates only regions of detailed shadow and not regions of detailed light areas. It would be possible to use the shadow-detail estimate without thresholding it, so that the shadow-detail estimate indicates all of the high frequency detail of the lighting estimate (both shadow and light detailed areas), but it is preferable to threshold the shadow-detail estimate to thereby attenuate the regions of detailed light areas such that the shadow-detail estimate indicates only regions of detailed shadow and not regions of detailed light areas. That is, only small dark regions are retained in the shadow-detail estimate, to thereby model ambient occlusion in the scene. In this way the shadow-detail estimate may be used such that only the shadow detail (not light detail) is maintained when the scene is relit. The generation of the shadow-detail estimate may comprise comparing values of the filtered lighting estimate to a threshold, μ, to thereby identify the one or more shadow regions of the relightable texture. For regions of the shadow-detail estimate which are not identified as shadow regions by the comparison (e.g. they are detailed light areas of the lighting estimate), values of the shadow-detail estimate may be set to a particular value (e.g. zero), or otherwise modified, to indicate that these regions are not shadow regions.

For example, the threshold, μ, may be set to be the midpoint, average, or "DC value", of the values of the filtered lighting estimate. In this case any values of the filtered lighting estimate which are not less than μ may be set to be equal to the threshold value μ in the shadow-detail estimate. For example, the shadow-detail estimate may be determined such that:

$$I_D(\underline{x}) = \begin{cases} HPF_1(I'_L(x)), & \text{if } HPF(I'_L(x)) < \mu \\ \mu, & \text{otherwise} \end{cases}$$

where $HPF_1(I'_L(\underline{x}))$ is the result of applying the first high-pass filter 212 to the lighting estimate $I'_L(\underline{x})$. As an example, the threshold μ may be zero. The shadow-detail estimate $I_D(\underline{x})$ has scalar values (i.e. it does not comprise multiple colour components) for the texel positions, $\underline{x}$.

The shadow-detail estimate $I_D(\underline{x})$ or "dark map" is substantially lighting independent. That is, the shadow-detail estimate $I_D(\underline{x})$ is does not strongly depend upon the lighting arrangement that lights the scene when the cameras 104 capture the views of the scene. The specific lighting arrangement used to light the scene imparts low frequency components into the lighting estimate, but high frequency components of the lighting estimate are more likely to be invariant to change in appearance with changes in lighting, whether or not caused by ambient occlusion. Therefore, the filtering of the lighting estimate $I'_L(\underline{x})$ removes (or at least reduces) the effects of the specific lighting arrangement. The thresholding then removes detailed light areas thereby leaving the dark map of finely detailed shadow which is largely lighting independent.

The texture module 208 uses the lighting estimate $I'_L(\underline{x})$, the colour estimate $I_A(\underline{x})$ (in particular the filtered colour estimate $I'_A(\underline{x})$) and the shadow-detail estimate $I_D(\underline{x})$ to determine the relightable texture for the image. In particular, in step S320 the texture module 208 filters the lighting estimate, $I'_L(\underline{x})$, to determine a detail estimate for the frame. The detail estimate represents the fine detail in the luminosity (i.e. lighting) of the scene. The relightable texture should include a certain amount of very high-frequency detail, so that fine details such as details in facial features and clothing may be preserved. The human vision system tends to be much more sensitive to detail in the luminosity of an image than to detail in the colour of the image. Therefore the detail in the image is determined from the lighting estimate.

The lighting estimate may be filtered by applying the second high-pass filter 214 to the lighting estimate to determine the detail estimate. The second high-pass filter 214 has a cut-off frequency which is higher than the cut-off frequency of the first high-pass filter 212 which is used to determine the dark map. In this way the dark map includes some frequency components of the lighting estimate which have a frequency that is lower than the cut-off frequency of the second high-pass filter 214, such that those frequency components are attenuated when determining the detail estimate. In this way, it can be considered that the detail estimate has a finer level of detail than the dark map.

The determination of the detail estimate may include thresholding the output of the second high-pass filter 214 to constrain the detail estimate to only including values above a threshold. For example the detail estimate may be constrained to include only positive values of the filtered lighting estimate (as filtered by the second high-pass filter 214). Thresholding the detail estimate in this way has been found to give better results in some cases.

In step S322 the texture module 208 determines the relightable texture. In particular, the values for the three colour components (C) of the relightable texture, $I_R^C(\underline{x})$, for texel position $\underline{x}$ are determined based on the values of the detail estimate (which is the high-pass filtered version of the lighting estimate denoted as $\mathrm{HPF}_2(I'_L(\underline{x}))$ filtered using the second high-pass filter 214), the colour components of the filtered colour estimate $I'^C_A(\underline{x})$ and the shadow-detail estimate $I_D(\underline{x})$. For example, the values of the relightable texture, $I_R^C(\underline{x})$, may be determined according to the equation:

$$I_R^C(\underline{x})=(I'^C_A(\underline{x})+\mathrm{HPF}_2(I'_L(\underline{x}))\times(\gamma(I_D(\underline{x})-\mu)+1)$$

where $\gamma$ is a scaling factor which determines how strong the influence of the dark map is. Due to the thresholding any filtered values of the lighting estimate with a value above $\mu$ are set to be equal to $\mu$ so for these values (which are not shadow regions) $I_D(\underline{x})-\mu=0$. Therefore, 1 is added to $\gamma(I_D(\underline{x})-\mu)$ to ensure that the pixels that should not be in shadow on the relightable texture (and which therefore have dark map values of $\mu$) are unaffected by the dark map $I_D$.

In other examples, the relightable texture, $I_R^C(\underline{x})$, may be determined by combining the lighting estimate, $I'_L(\underline{x})$, the colour estimate, $I_A^C(\underline{x})$, and the shadow-detail estimate, $I_D(\underline{x})$ in other ways than that shown in the equation above. That is, the equation above is just one example of how the relightable texture, $I_R^C(\underline{x})$, may be determined.

It is noted that steps S316, S318 and/or S320 of filtering the colour estimate to attenuate backscatter and filtering the lighting estimate to determine the detail estimate may be considered to be part of the process of determining the relightable texture.

In step S324 the determined relightable texture is stored for subsequent use in rendering the image. For example, the relightable texture may be stored in the texture store 210. The relightable texture may be compressed using any suitable texture compression scheme (e.g. using PVRTC texture compression) before being stored in step S324.

The material specularity estimate which was determined in step S312 may be stored in an alpha channel of the relightable texture. In this way, when the image is rendered a single texture lookup is sufficient for rendering the image.

The method described herein with reference to FIG. 3 for determining the relightable texture may be implemented before rendering of the image (e.g. which may be a frame of a video sequence) commences. In this way, the model and the texture for the scenes of the image can be determined offline, i.e. before the image is rendered. The determining of the model and the texture may be performed in a device which has a large amount of available resources (e.g. processing power and memory capacity). The stored relightable texture and model may be provided to another device (e.g. a mobile phone) for rendering the image from a rendering viewpoint. The device which renders the image may not have large amounts of resources (e.g. processing power and memory capacity) available. However, due to the fact that the relightable texture and model are determined offline, the amount of processing used in run-time (i.e. during rendering of the image) is reduced. When rendering the scene of an image, the relightable texture is relit according to a lighting arrangement that is set for the render and the image is rendered from a rendering viewpoint which is also set for the render. These processes can be performed quickly using 3D graphics rendering techniques and therefore when the image is a frame of a video sequence, the video sequences can be played out at an acceptable frame rate (e.g. twenty frames per second or more) even on devices which may not have large amounts of processing resources. Current mobile phones, for example, do not have sufficient processing resources to determine the relightable textures, but some current mobile phones do include hardware for accelerated lighting and rendering of textured 3D models.

The ability to relight scenes in images, such as frames of a video sequence, using relightable FWR allows scenes captured from the "real world" to be integrated seamlessly into computer-generated scenes, by matching the lighting conditions of the rest of the scene. Using techniques such as shadow-mapping and matching both the direction and colour of the scene lighting allows for realistic in-situ rendering.

The method steps described above in relation to FIG. 3 which are not described as being performed by one of the modules shown in FIG. 2 (i.e. the separation module 204, the shadow-detail module 206 and the texture module 208) may be performed by one of those modules or by one or more other modules in the processing block 202 which are not shown in FIG. 2. Furthermore, the functions of the methods described above in relation to FIG. 3 may be performed by other arrangements of processing modules than those described and shown herein. The modules of the processing block 202 may be implemented in hardware or software or a combination thereof. Where the modules are implemented in software, they may be implemented by executing a computer program on a processor (e.g. a CPU or a GPU), wherein the computer program comprises instructions for carrying out the method steps described herein.

Figure 5A:
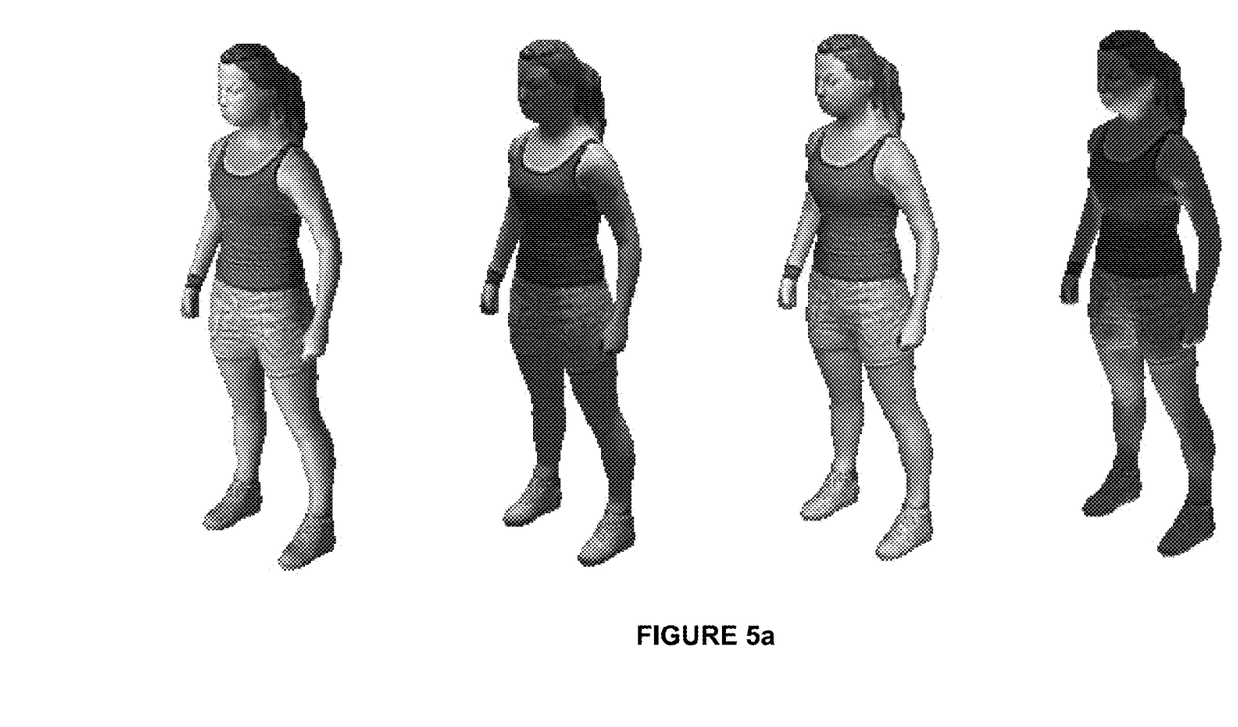
FIG. 5a shows views of a first scene under four different lighting conditions determined without using a shadow-detail estimate.
Figure 5B:
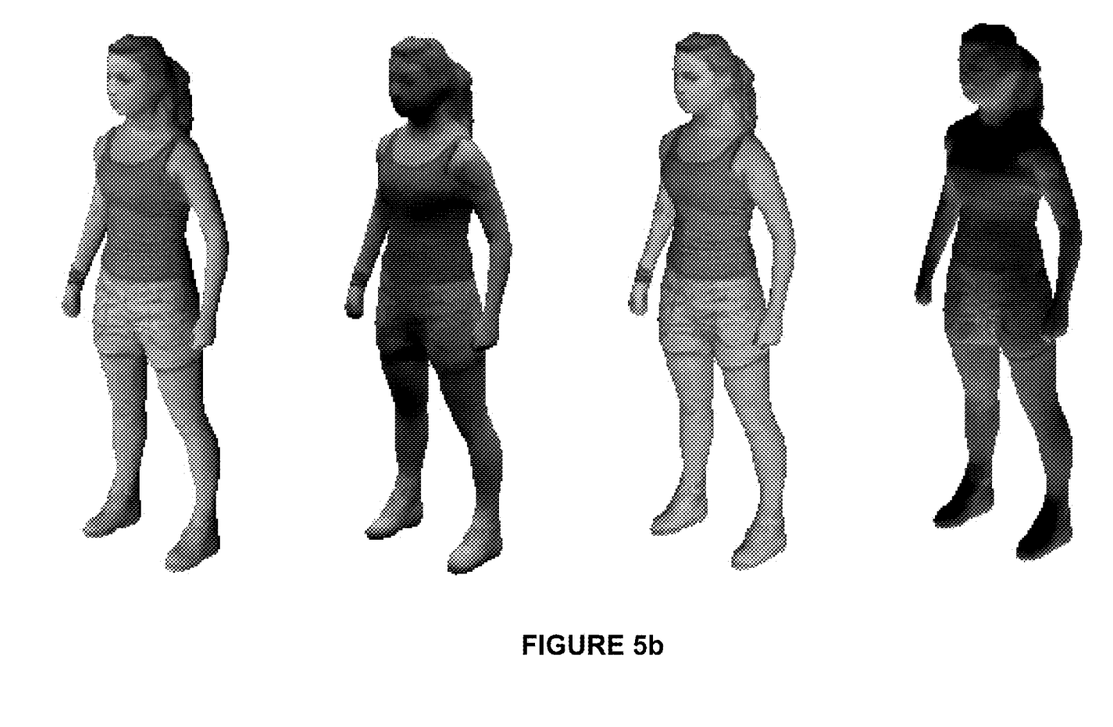
FIG. 5b shows views of a second scene under four different lighting conditions determined using a shadow-detail estimate.

FIG. 5a shows views of a first scene under four different lighting conditions determined without using the shadow-detail estimate to retain regions of ambient occlusion as described above. By comparison, FIG. 5b shows views of a second scene under four different lighting conditions determined using the shadow-detail estimate to retain regions of ambient occlusion as described above.

The examples described in detail above relate to free-viewpoint rendering. However, the generation of a shadow-detail estimate as described above (e.g. by separation of the initial texture and filtering of the lighting estimate) can be used to determine a relightable texture (e.g. in which the high-frequency shadow regions are maintained), in other examples where the initial texture may be determined differently to how it is determined in free-viewpoint rendering. For example, the initial texture does not need to be derived from multiple views of the scene. That is, in some examples, the initial texture may be derived from a single view of the scene. As another example, the rendering viewpoint does not need to be different to the one or more camera viewpoints. The lighting that is to be applied to the texture for rendering may be different to the lighting of the scene when the initial texture is determined; this is the case irrespective of whether the rendering viewpoint is the same as any of the camera viewpoints. Therefore, there are some examples in which a relightable texture is determined, using an initial texture captured from a single camera, for use in rendering the image from a rendering viewpoint which is the same as the camera viewpoint.

The use of the shadow-detail estimate to retain regions of ambient occlusion as described above means that regions of ambient occlusion, such as the inside of a vase, facial features (e.g. eye sockets), and folds in clothing are kept in shadow even when the scene is relit. This increases the plausibility of the final rendered scene.

Generally, any of the functions, methods, techniques or components described above can be implemented in modules using software, firmware, hardware (e.g., fixed logic circuitry), or any combination of these implementations. The terms "module," "functionality," "component", "block" and "logic" are used herein to generally represent software, firmware, hardware, or any combination thereof.

In the case of a software implementation, the module, functionality, component or logic represents program code that performs specified tasks when executed on a processor (e.g. one or more CPUs). In one example, the methods described may be performed by a computer configured with software of a computer program product in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a non-transitory computer (machine)-readable storage medium and thus such a non-transitory medium excludes a propoagating wave or signal medium. Examples of a non-transitory computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

Those skilled in the art will also realize that all, or a portion of the functionality, techniques or methods may be carried out by a dedicated circuit, an application-specific integrated circuit, a programmable logic array, a field-programmable gate array, or the like. For example, the module, functionality, component or logic may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, functionality, component or logic may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements a module, functionality, component or logic described above, such as HDL (hardware description language) software, as is used for designing integrated circuits, or for configuring programmable chips, to carry out desired functions. That is, there may be provided a computer readable storage medium having encoded thereon computer readable program code for generating a processing block configured to perform any of the methods described herein, or for generating a processing block comprising any apparatus described herein.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

The invention claimed is:

1. A method of determining a relightable texture for use in rendering an image from a rendering viewpoint under arbitrary lighting conditions, wherein at least one view of a scene from a respective at least one camera viewpoint represents the image, the method comprising:
   separating an initial texture for the image into a lighting estimate and a colour estimate, said initial texture being derived from the at least one view of the scene from the at least one camera viewpoint;
   generating a shadow-detail estimate by filtering the lighting estimate to attenuate low frequency components thereof, wherein the shadow-detail estimate indicates one or more shadow regions of the relightable texture which are to remain in shadow when the image is rendered; and
   determining the relightable texture for the image using the lighting estimate, the colour estimate and the shadow-detail estimate.

2. The method of claim 1 wherein the shadow-detail estimate is generated to indicate levels of shadow that are present in the one or more shadow regions.

3. The method of claim 1 wherein the shadow-detail estimate is generated to comprise a set of per-texel values, each of which indicates a level of shadow to be applied to a respective texel within the one or more shadow regions of the relightable texture when the relightable texture is determined.

4. The method of claim 1 wherein said generating a shadow-detail estimate comprises comparing values of the filtered lighting estimate to a threshold to thereby identify the one or more shadow regions of the relightable texture.

5. The method of claim 4 wherein said generating a shadow-detail estimate further comprises, for regions of the shadow-detail estimate which are not identified as shadow regions by the comparison, setting values of the shadow-detail estimate to a particular value which indicates that these regions are not shadow regions.

6. The method of claim 1 wherein said filtering the lighting estimate comprises applying a first high-pass filter to the lighting estimate to thereby attenuate the low frequency components of the lighting estimate.

7. The method of claim 1 wherein said determining the relightable texture for the image comprises filtering the lighting estimate to determine a detail estimate for the image, wherein the relightable texture is determined using the detail estimate, the colour estimate and the shadow-detail estimate.

8. The method of claim 7 wherein said filtering the lighting estimate to determine a detail estimate for the image comprises applying a second high-pass filter to the lighting estimate, wherein a cut-off frequency of the second high-pass filter is higher than a cut-off frequency of the first high-pass filter.

9. The method of claim 1 wherein materials in the initial texture for the image are segmented from each other and material colour estimates are determined for the respective materials, wherein said separating the initial texture comprises determining the lighting estimate using the initial texture and the material colour estimates for the materials in the initial texture.

10. The method of claim 9 wherein said separating the initial texture comprises determining the colour estimate using the initial texture and the determined lighting estimate.

11. The method of claim 9 wherein the initial texture and the colour estimate each comprise three colour components, and wherein the material colour estimates each comprise three colour components and wherein said determining the lighting estimate further comprises combining three colour components into a single component for the lighting estimate.

12. The method of claim 1 wherein the views of the scene are captured against a coloured background and wherein said determining the relightable texture for the image comprises filtering the colour estimate to attenuate backscatter from the coloured background.

13. The method of claim 4 wherein colour components of the relightable texture, $I_R^C(\underline{x})$, for position $\underline{x}$ in the relightable texture are determined according to the equation:

$$I_R^C(\underline{x})=(I'_A{}^C(\underline{x})+\text{HPF}_2(I'_L(\underline{x}))\times(\gamma(I_D(\underline{x})-\mu)+1)$$

where $I'_A{}^C(\underline{x})$ represents filtered versions of the colour components of the colour estimate, $\text{HPF}_2(I'_L(\underline{x}))$ is a filtered version of the lighting estimate which has been filtered with a high-pass filter, $I_D(\underline{x})$ is the shadow-detail estimate, $\mu$ is the threshold and $\gamma$ is a scaling factor.

14. The method of claim 1 wherein there are a plurality of views of the scene from a respective plurality of camera viewpoints representing the image and wherein the rendering viewpoint is not the same as any of the camera viewpoints, and wherein said initial texture is derived from the views of the scene from the plurality of camera viewpoints.

15. The method of claim 14 wherein the initial texture is a blended texture, and wherein the method further comprises determining the blended texture by projecting the views of the scene from the camera viewpoints onto the model of the scene and blending the projected views.

16. An image processing system configured to determine a relightable texture for use in rendering an image from a rendering viewpoint under arbitrary lighting conditions, wherein at least one view of a scene from a respective at least one camera viewpoint represents the image, the image processing system comprising a processing block configured to:
- separate an initial texture for the image into a lighting estimate and a colour estimate, said initial texture being derived from the at least one view of the scene from the at least one camera viewpoint;
- generate a shadow-detail estimate by filtering the lighting estimate to attenuate low frequency components thereof, wherein the shadow-detail estimate indicates one or more shadow regions of the relightable texture which are to remain in shadow when the image is rendered; and
- determine the relightable texture for the image using the lighting estimate, the colour estimate and the shadow-detail estimate.

17. The image processing system of claim 16 wherein the processing block is further configured to filter the lighting estimate by applying a first high-pass filter to the lighting estimate to attenuate the low frequency components of the lighting estimate.

18. The image processing system of claim 17 wherein the processing block is configured to filter the lighting estimate to determine a detail estimate for the image by applying a second high-pass filter to the lighting estimate, wherein a cut-off frequency of the second high-pass filter is higher than a cut-off frequency of the first high-pass filter, and wherein the processing block is configured such that the relightable texture for the image is determined using the detail estimate, the colour estimate and the shadow-detail estimate.

19. The image processing system of claim 16 further comprising a texture store configured to store the determined relightable texture for subsequent use in rendering the image.

20. Image processing apparatus configured to determine a relightable texture for use in rendering an image from a rendering viewpoint under arbitrary lighting conditions, wherein at least one view of a scene from a respective at least one camera viewpoint represents the image, the image processing apparatus comprising:
- a separation module configured to separate an initial texture for the image into a lighting estimate and a colour estimate, said initial texture being derived from the at least one view of the scene from the at least one camera viewpoint;
- a shadow-detail module configured to generate a shadow-detail estimate by filtering the lighting estimate to attenuate low frequency components thereof, wherein the shadow-detail estimate indicates one or more shadow regions of the relightable texture which are to remain in shadow when the image is rendered; and
- a texture module configured to determine the relightable texture for the image using the lighting estimate, the colour estimate and the shadow-detail estimate.

* * * * *